Feb. 27, 1934.　　E. A. JOHNSTON ET AL　　1,948,921
HARVESTER THRESHER
Filed Oct. 14, 1926　　4 Sheets-Sheet 3
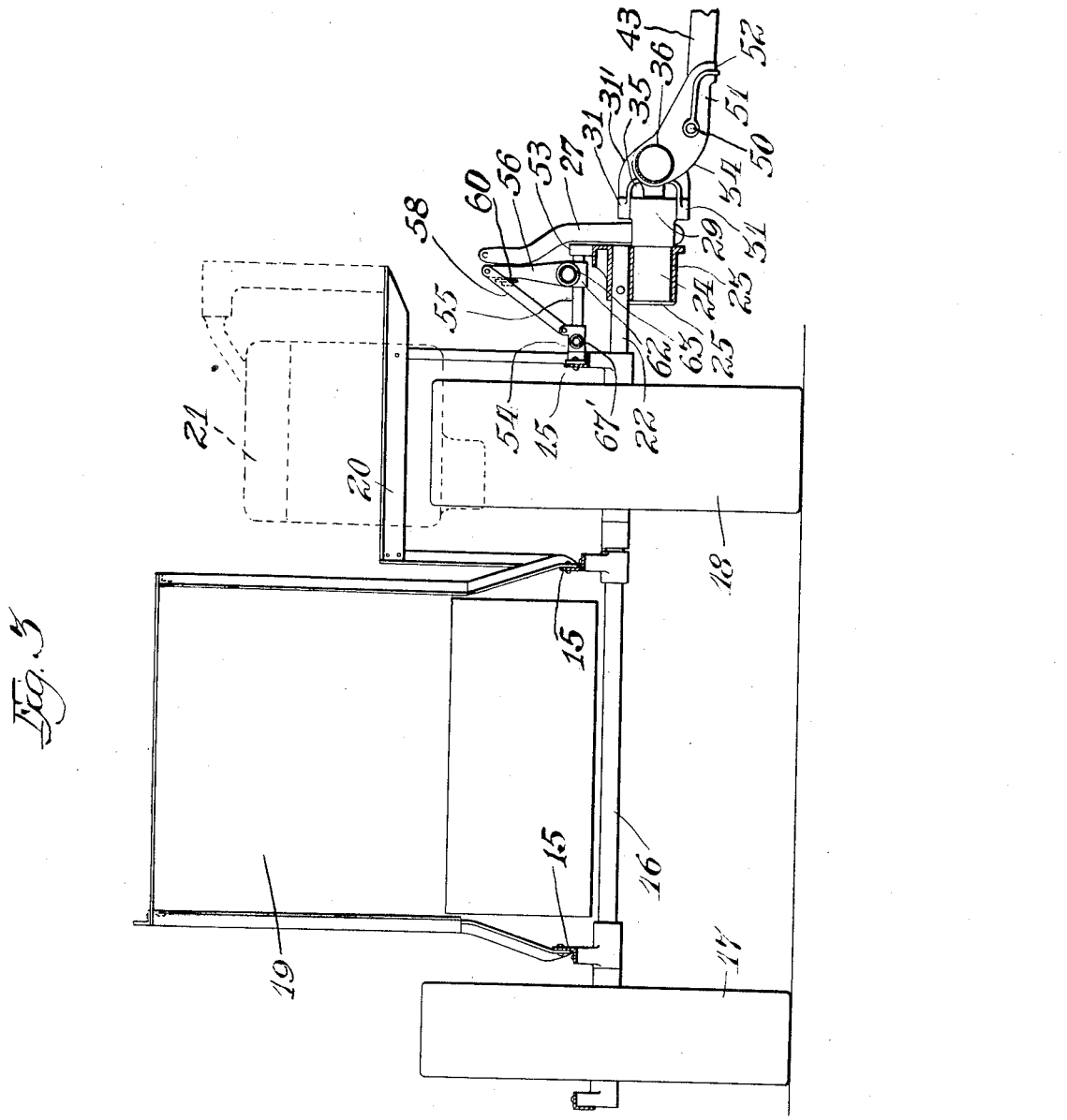

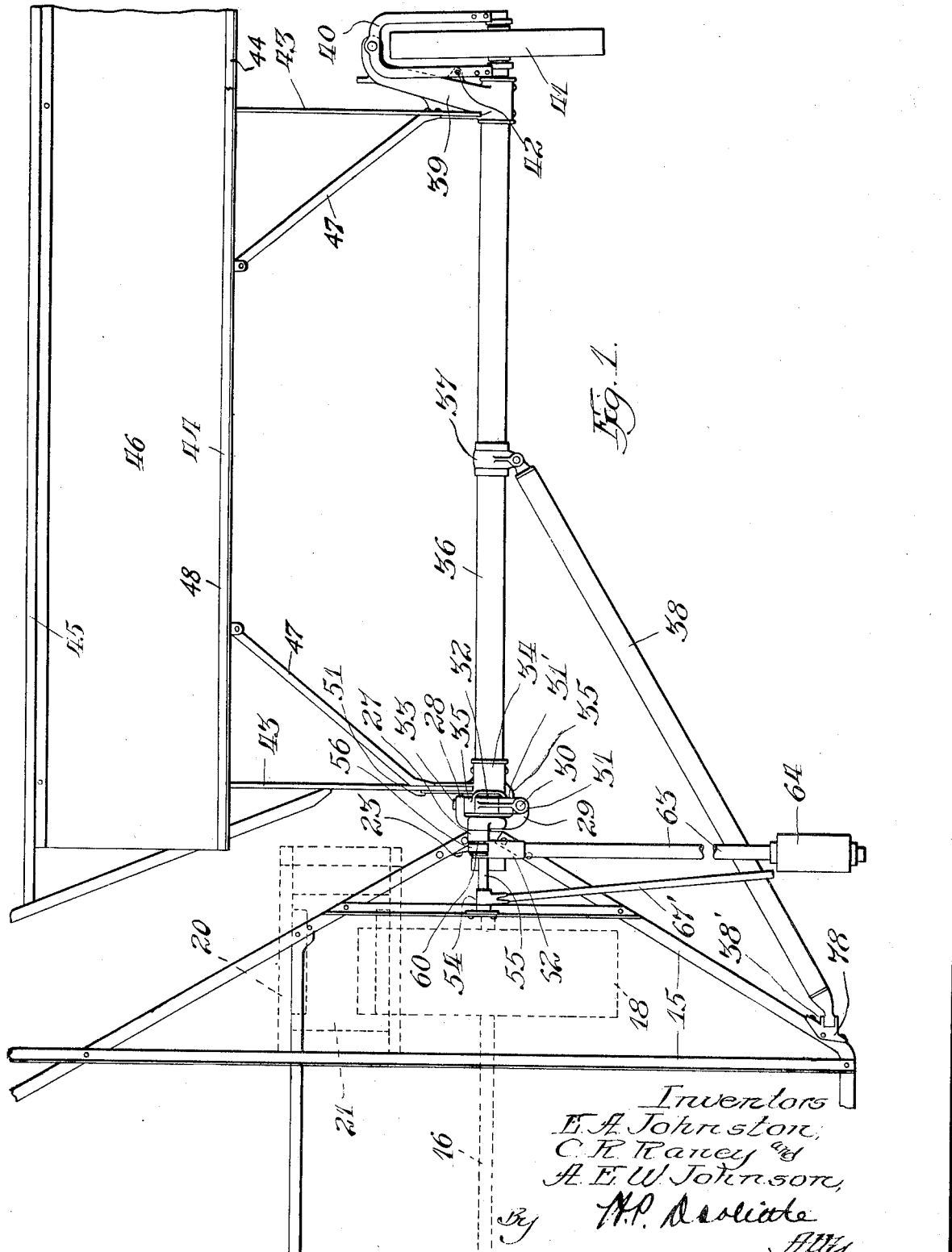

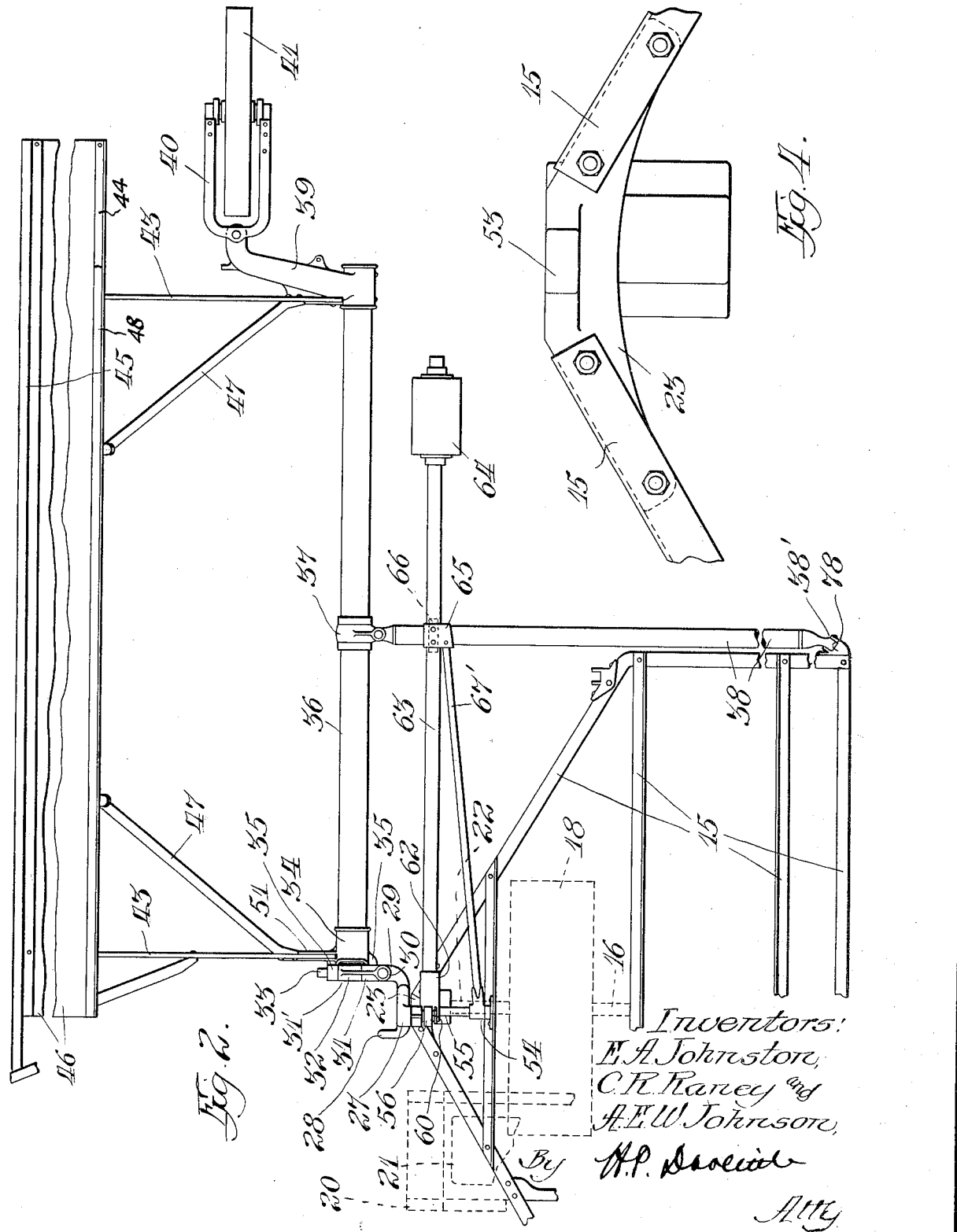

Feb. 27, 1934.  E. A. JOHNSTON ET AL  1,948,921
HARVESTER THRESHER
Filed Oct. 14, 1926   4 Sheets-Sheet 4
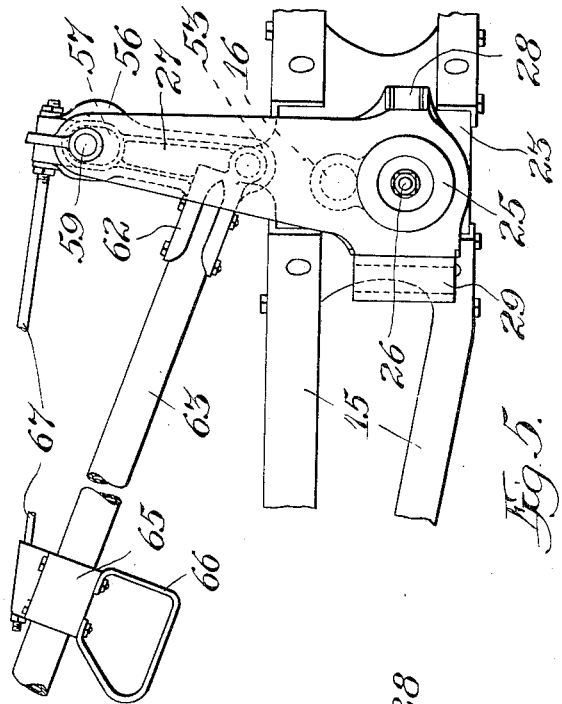
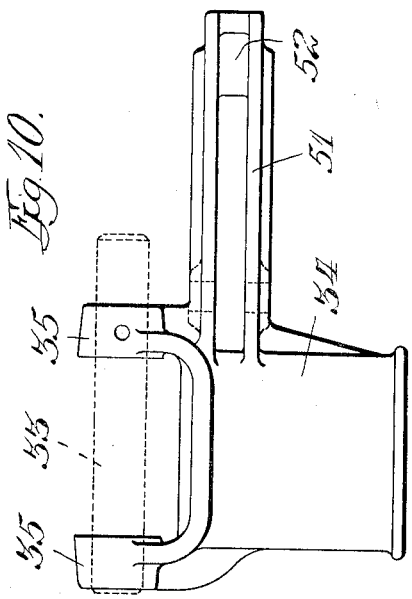
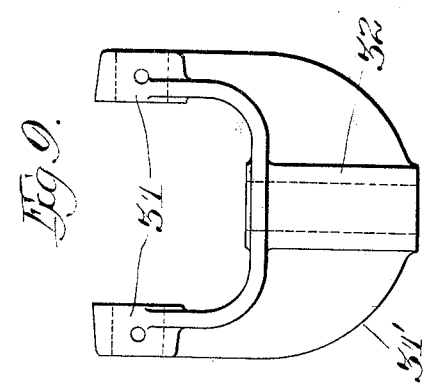
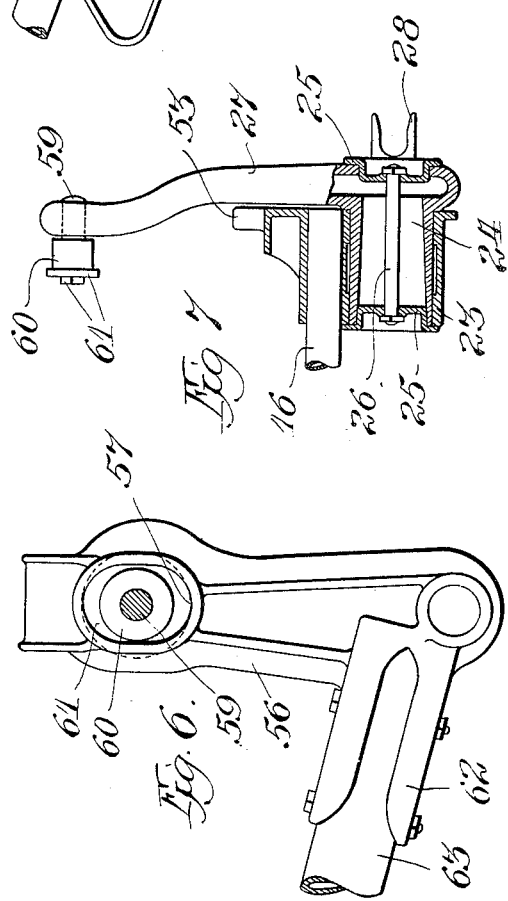
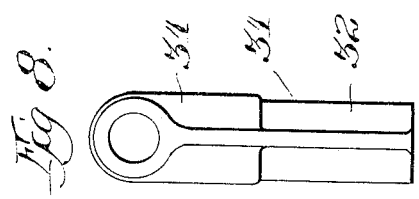
Inventors:
E. A. Johnston
C. R. Raney and
A. E. W. Johnson
By H. P. Darling
Atty.

Patented Feb. 27, 1934

1,948,921

UNITED STATES PATENT OFFICE 1,948,921

HARVESTER THRESHER

Edward A. Johnston, Chicago, Clemma R. Raney, Riverside, and Arnold E. W. Johnson, Chicago, Ill., assignors to International Harvester Company, Chicago, Ill., a corporation of New Jersey Application October 14, 1926. Serial No. 141,449

30 Claims. (Cl. 56—20)

This invention is in the art of harvester threshers and it relates especially to means for facilitating transportation of such machines through narrow places and over narrow highways.

As is well known in this art, these harvester threshers comprise a thresher part and a laterally offset harvester part, which latter part embodies a vertically adjustable header platform. These header platforms in the larger machines cut a swath of considerable width, usually not less than twelve feet. As a consequence the overall width of these machines is so great that transportation of the same through narrow places, such as gateways, and over narrow roads cannot be accomplished, without first removing the entire header platform, or by folding said platform rearwardly alongside the thresher part or body of the machine. These alternatives, however, in standard machines, are not easy of accomplishment because the header platform must be counterbalanced to make vertical adjustments thereof easy when cutting. The platform is supported on an axle member in these machines, the platform extending forwardly of the axle while the counterbalance, in the form of one or more weighted arms, extends rearwardly of such axle. Thus, if the header platform were completely removed, the counterbalance would also have to be removed; while the folding method could likewise not be achieved without disturbing the counterbalancing mechanism.

The folding platform idea in practice is preferable and the problem is to provide such an arrangement which is operable without disturbing the counterbalancing means.

Accordingly, a primary object of this invention is to provide a novel form of counterbalancing means for machines of this class.

Another primary object is to provide in a harvester thresher a folding platform which may be folded without disturbing the counterbalancing means.

Another object is to provide a novel, simple and effective connection for mounting the harvester axle, so that it may rock, fold, and float by rising and falling.

Other objects will be aparent to those skilled in this art as the present description progresses.

These very desirable objects are accomplished, briefly, in the provision of a harvester thresher embodying a thresher part and a laterally offset harvester part, said harvester part comprising a header platform carried on an axle so construced and arranged as to permit the same to rock on its axis, float up and down on its pivot, and fold backwardly alongside the thresher part on another pivot. The rocking movement is balanced by a counterbalancing means located on the thresher part, but operable in its counterbalancing action entirely independent of said thresher. Therefore, as this counterbalance is carried on the thresher part, obviously the harvester part can be folded back for transport without in any way disturbing or interfering with said counterbalance.

Reference should now be made to the accompanying sheets of drawings showing an illustrative embodiment which this invention may assume in practice. In the drawings the same characters of reference denote like parts throughout the several views, and—

Figure 1 is a plan view of so much of a harvester thresher as is necessary to a disclosure of this invention, and in this view the harvester part is shown in normal cutting position;

Figure 2 is a similar view but showing the harvester part in its horizontal folded position;

Figure 3 is a rear view of a portion of the harvester thresher;

Figure 4 is a detail view of the frame construction;

Figure 5 is a side elevational detail view, showing the mounting of the counterbalancing means;

Figure 6 is a detail view of a part of the counterbalancing means;

Figure 7 is a similar detail view partly in section and viewing a right angle part of the structure shown in Figure 5; and, Figures 8, 9 and 10 are, respectively, detail views of the castings forming the two-way hinge for the harvester support or axle.

The thresher part of the harvester thresher of this invention embodies, as shown in Figures 1, 2 and 3, a main frame 15 longitudinally disposed on a main axle or thresher support 16 journaled in a right hand wheel 17 and a left hand wheel 18, as viewed from the front. The axle 16 is stationary and the frame 15 is rigidly carried thereby. As shown particularly well in Figure 3, this main frame 15 rigidly carries the thresher or separator housing 19. Disposed above the left hand wheel 18 and forwardly thereof and above the same, the main frame 15 carries a super-frame structure 20 on which may be mounted an engine 21, generally indicated in Figures 1, 2 and 3, which engine drives the operative parts of the thresher and harvester, as is well known in this art.

In the drawings, and particularly Figure 3, it will be seen that the axle 16 has an extension 22 which extends a substantial distance grainwardly beyond the left hand wheel 18. Suitably keyed or otherwise made fast to the end of this extension 22 is a casting 23 depending below the extension 22 and forming a journal for a grainwardly extending short stub shaft 24, said stub shaft being rockably mounted in the casting 23 for a purpose presently to appear, (see Figure 7). The stub shaft 24 is hollow and is made fast to the casting 23 by means of end plates 25 locked together by a bolt 26. The construction is such that free rocking movement of the stub shaft 24 is permitted.

The stubbleward end of the stub shaft 24 beyond the casting 23 is formed integrally with an upstanding arm 27 which, as clearly shown in the drawings, is bent or offset at its upper end in a stubbleward direction. The member 27 carries on its grainward face adjacent its lower end and substantially in line with the bolt 26 at its forward side, a horizontally disposed bifurcated socket 28, and at its back side, a vertically disposed closed socket 29. The socket 29 is provided with a pin 30, the upper and lower ends of which receive the arms 31 of a bifurcated bracket 31', (see Figures 8 and 9), which bracket is formed with a centrally arranged right angularly extending bore 32. Passed through the bore 32 is a horizontal pin 33 carried by a second bifurcated casting 34 having arms 35 in which the pin 33 is carried, as shown in Figure 10. The casting 34 has made fast therein a harvester support or axle 36.

It will thus be seen that the harvester support 36, when in the position shown in Figure 1, may freely pivot or float up and down to conform with irregularities in the ground, around a pivot on the pin 33 carried in the arms 35 of the casting 34. In this position a free forward end of the pin 33 engages the bifurcated socket 28 on the front side of the arm 27. The support 36 likewise may be folded back rearwardly alongside the thresher part around the vertical pin 30 as a pivot, which is carried in the vertical socket 29 on the back side of the arm 27.

Intermediately of its length the harvester axle or support 36 is provided with a collar 37, which has pivotally connected thereto, as shown in Figure 1, a normally diagonally and rearwardly extending brace bar 38, which is connected to the main frame 15, as shown at 38', and in this manner, during normal operation, the vertical pin 30 used for folding is held inoperative although rocking movement of the support 36 with the stub shaft 24, and a vertical pivotal movement are permitted, as will be understood.

The grainward end of the support 36 carries a forwardly extending arm 39, at the front end of which is pivotally connected a yoke 40 in which is journaled a grain wheel 41. The yoke 40 is normally locked to the arm 39 by a detachable pin 42, and in this manner the wheel 41 is rigidly held in place to function as a grain wheel. When the harvester thresher is being transported with the harvester part folded back alongside the thresher, as shown in Figure 2, the pin 42 is removed to permit the yoke 40 to swing freely on its pivot, and caster.

The castings 34 and 39 on the support 36 each carry a forwardly extending bar 43, the forward ends of which support the usual rear angle bar 44 and the front Z-bar 45 upon which is carried a harvester header platform 46. Diagonal brace members 47 are provided for bracing a back wall 48 for the header platform.

The header platform 46, at the forward end of which is carried the usual grain cutting mechanism, (not shown), must be raised and lowered so that the height of cut may be varied in accordance with the length of the grain encountered as the harvester thresher travels through the field. In the present embodiment this can be accomplished in any conventional way, such for example as by pulling up or pushing down on the Z-bar 45 by any suitable lever controlled mechanism well known in this art, and, therefore, not herein shown. During the cutting operation, the parts are as in Figure 1, with the header platform extending forwardly of the support 36. It will be noted that the stubbleward bar 43 is pivotally connected at 50 to a forward extension 51 of the casting 34, and similarly the stubbleward arm 43 is pivoted to the casting 39. Ledges, or rests, 52 are provided on these castings 34 and 39 for supporting the arms 43, as is well known in this art.

Because of the great weight of the header platform 46, it would be very difficult manually to raise and lower the same without some form of counterbalancing means. Accordingly, such means has been provided in the present invention, and the same will now be described. Attention is particularly directed to Figures 3, 5, 6 and 7. Above the axle extension 22 of the thresher part, the main frame 15 and the casting 23 are provided with journals 53 and 54 in which is rockably journaled a rockshaft 55. The rockshaft 55 is provided with an upstanding arm 56, the upper end of which is provided with an elongated slot 57, the said arm being rockable with the shaft 55. The upper end of the arm 56 is strengthened by a brace 58 pivoted thereto and to the journal 54. It will be remembered that the arm 27 on the hollow stub shaft 24 extends upwardly and is bent in a stubbleward direction. The purpose of this will now be clear, for it can be seen that the upper end of this arm 27 is provided with a pin 59 on which is freely rotatable a roller 60, which is fitted into the slot 57 of the adjacent arm 56, and is so held in that position by means of a nut and washer 61. The lower end of the arm 56, by means of a socketed casting 62, carries a rearwardly extending arm 63 of substantial length on the rear end of which is carried by a heavy weight 64. Intermediately of its length, the arm 63 has formed thereon a collar 65, the lower end of which is provided with a shoe 66 and the upper end of which has connected thereto a brace rod 67, the forward end of which is connected to the upper end of the arm 56, (see Figure 5). A second brace rod 67' extends from the casting 65 to the journal 54 on the rockshaft 55.

When the harvester is in its normal cutting position, as shown in Figure 1, it can now be seen that, if the platform is rocked downwardly, the support 36 will also rock forwardly on its horizontal axis and through the articulated connections described will rock the weighted arm 63 upwardly to counterbalance such a movement of the header platform. In practice, to take care of the torque developed, the support 36 will be in the form of a drawn tube or pipe of high grade steel. Vice versa, when the platform is raised, the support 36 will rock toward the rear on its horizontal axis, and the weighted arm 63 will move downwardly to assist elevation of the platform, as will now be understood.

It will be remembered that the main object of this invention was to provide in a harvester thresher a harvester and support which could be folded back rearwardly alongside the thresher part without disturbing the counterbalancing means for the harvester platform. It can now be appreciated that the mechanism just described accomplishes this object because of the construction of the connection of the harvester support to the thresher part and the articulated connection with the counterbalance arm carried on the main frame part.

Of course, when the harvester part is folded, the weighted arm 63 performs no counterbalancing function, and the shoe 66 carried thereby then rests on the brace 38 which has been removed from its normal position at its stubbleward end and made fast to another socket indicated at 78 on the stubbleward end of the thresher main frame, shown in Figure 2. It is believed that the operation and use of this invention will be quite clear from the above detailed description and, therefore, only a brief description thereof will be made at this time, as it is thought that such a description should suffice.

In normal operation, the header assumes the position shown in Figure 1, with the grain wheel yoke 40 locked securely to the casting 39. Vertical adjustments of the platform 46 are accomplished in any conventional manner, and its rocking movements with its support 36 are counterbalanced by the weighted arm 63 through the connections between the arms 27 and 56. In this normal cutting position, the support 36 is permitted a free rocking movement with the stub shaft 24 in the casting 23, and similarly the support 36 may rise and fall automatically to conform with irregularities in the ground, because of the provision of the horizontal pivot pin 33 for that purpose.

When it is desirable to transport the harvester thresher through narrow places, the stubbleward end of the reel and platform will be disconnected as is conventional in folding machines of this type, and the pin 42 is removed to free the yoke 40 from the casting 39, so that the yoke 40 and wheel 41 will swing around and caster freely. The support 36 and with it the platform 46 can now easily be swung through a right angle to the rear about the vertical pin 30 to the position as shown in Figure 2, after first removing the stubbleward end of the diagonal brace pipe 38, as will be understood. With the parts as shown in Figure 2, the brace pipe 38 is made fast to the socket 78 and the weighted balance arm 63, by means of the shoe 66, comes to a position of rest on said brace 38. The wheel 41 is now in a position to function as a training caster wheel. This folding operation, it can be seen, has been accomplished without in any way disturbing the counterbalancing means.

It is to be understood, of course, that the mechanism herein shown is illustrative of one form which a harvester thresher constructed in accordance with this invention may assume in practice and that the same is susceptible of a great many modifications in structure and that it is the intention to cover such changes as fall within the spirit and scope of this invention as indicated in the following claims.

What is claimed is:

1. In a harvester thresher, the combination of a thresher part, a rockable harvester part including a rockable axle to support the same, said axle with the harvester part being hingedly related to the thresher part, and means located on the thresher part but functioning independently thereof for counterbalancing rocking movement of the harvester part.

2. In a harvester thresher, the combination of a main frame rigidly carried on an axle, a thresher rigidly mounted on said frame, a harvester support laterally offset with respect to the main frame and connected thereto for floating movement, a harvester rockably carried by said support, and means on the main frame for counterbalancing rocking movements of said harvester.

3. In a harvester thresher, the combination of a main frame, a thresher rigidly connected thereto, a harvester support laterally offset with respect to the main frame and hingedly and rockably connected thereto, a forwardly extending harvester on said support and rockable therewith, and counterbalancing means for said support and harvester, said means comprising a rearwardly extended weighted arm carried on the main frame adjacent the thresher.

4. In a harvester thresher, the combination of a main frame, a stationary axle therefor, a thresher on the main frame, a harvester including an axle support therefor rockably and hingedly connected to the stationary axle, and means on the stationary axle movable independently of the thresher for counterbalancing rocking movements of said harvester.

5. In a harvester thresher, the combination of a thresher carried rigidly on a stationary axle, a rearwardly extending weighted arm carried on said axle, a second axle rockably and hingedly connected to the thresher axle, a forwardly extending harvester supported on said second axle to rock therewith, and means connecting said harvester axle with the weighted arm, whereby said arm will counterbalance rocking movements of the harvester.

6. In a harvester thresher, the combination of a thresher carried on a transverse axle and a pair of wheels, said axle being extended beyond the left hand wheel, a harvester rockably and floatingly connected to said axle extension, and means on said extension for counterbalancing rocking movements of said harvester.

7. In a harvester thresher, the combination of a thresher rigidly connected to a transverse stationary axle and a pair of wheels, a harvester including an axle rockably and hingedly connected to said first axle, and counterbalancing means for the harvester and its axle located between the left hand of the aforementioned wheels and the connection of the harvester axle to the thresher axle.

8. In a harvester thresher, the combination of a thresher carried on a transverse axle and a pair of wheels, said axle being extended beyond the left hand wheel, a journal on said axle extension, a stub shaft journaled rockably in said journal, a harvester including an axle connected to said stub shaft to rock therewith, and counterbalancing means on the axle extension articulated with the stub shaft to control rocking movements of the harvester and its axle.

9. In a harvester thresher, the combination of a thresher carried on a transverse axle and a pair of wheels, said axle being extended beyond the left hand wheel, a journal on said axle extension, a stub shaft rockably journaled in said journal, and a harvester including an axle rockable with the stub shaft and connected thereto to be foldable rearwardly from its normal transverse position to a position longitudinally alongside the thresher.

10. In a harvester thresher, the combination of a thresher carried on a transverse axle and a pair of wheels, said axle being extended beyond the left hand wheel, a journal on said axle extension, a stub shaft rockably journaled in said journal, a harvester including an axle, and means connecting said harvester axle to said stub shaft whereby the harvester axle may rock with the stub shaft and may float and fold independently of the stub shaft.

11. In a harvester thresher, the combination of a thresher carried on a transverse axle and a pair of wheels, a journal on the grainward end of said axle, a stub shaft rockably journaled therein, a harvester including an axle, means connecting the harvester axle to the stub shaft so that the two may rock together, and a two-way hinge included in said connecting means to enable the harvester and its axle to float and be folded.

12. In a harvester thresher, the combination of a stationary thresher supporting axle, a stub shaft rockably connected to the grainward end of the thresher axle, and a harvester axle rockable with the stub shaft and connected thereto by means for enabling the harvester axle to float and to be foldable.

13. In a harvester thresher, the combination of a thresher supporting axle, a stub shaft rockably connected thereto, a harvester supporting axle, and a connection between the harvester axle and stub shaft for causing the two to rock together and the harvester axle to have an independent pivotal vertical movement and an independent pivotal folding movement in a horizontal plane.

14. In a harvester thresher, the combination of a main frame, a thresher rigidly mounted thereon, a harvester including a rockable support hingedly connected to the main frame, means on the main frame independent of the thresher for counterbalancing the harvester, and means to enable folding of the harvester support without disturbing the counterbalancing means.

15. In a harvester thresher, the combination of a thresher rigidly supported on a stationary axle, a harvester including a support rockably and hingedly connected to said axle, means on the axle for counterbalancing the harvester, and means to enable folding of the support without disturbing the counterbalancing means.

16. In a harvester thresher, the combination of a thresher carried on a main frame, a harvester including a support rockably connected to said frame, means on said frame movable independently of the thresher for counterbalancing the harvester, and means to enable folding of the harvester support without disturbing said counterbalancing means.

17. In a harvester thresher, the combination of a stationary thresher supporting axle, a harvester supporting axle rockably connected to the thresher axle, counterbalancing means on the thresher axle, and means articulated with said counterbalancing means for enabling the harvester axle to be folded without disturbing said counterbalancing means.

18. In a harvester thresher, the combination of an axle, a main frame and thresher carried thereby, a journal on said axle, a stub shaft rockably mounted in said journal, a support pivotally connected to said shaft for folding, a harvester on said support, counterbalancing means for the harvester on the main frame and axle, and means enabling said harvester and support to be folded without disturbing said counterbalancing means.

19. In a harvester thresher, the combination of a main frame carried on a pair of wheels and an axle, a thresher on the main frame, said axle being extended beyond the left hand wheel, a journal on said axle extension, a support carrying a harvester rockably mounted in said journal, means on said main frame and axle extension for counterbalancing said support and harvester, and means to enable folding of said support without disturbing said counterbalancing means.

20. In combination, a stationary axle, a rockable axle, a thresher fast on the stationary axle, a harvester rockable with the rockable axle, and a counter-balance for the harvester located on the stationary axle, said rockable axle being hingedly related to the stationary axle.

21. In combination, a stationary axle, a rockable axle substantially coaxial with the stationary axle, a thresher fast on the stationary axle, a harvester rockable with the rockable axle, and a counter-balance for the harvester located on the stationary axle, said rockable axle being hingedly related to the stationary axle.

22. In a three wheel harvester thresher, the combination of a thresher part carried by a pair of wheels, a harvester axle support extending from the intermediate wheel and having its grainward end carried in a grain wheel, said support being hingedly related to the thresher part, a harvester rockably supported on the axle support, and means located on the thresher part but functioning independently thereof for counter-balancing rocking movements of the harvester part.

23. In a combination harvester-thresher, the combination, with a thresher, of counterbalancing means positioned at one side of the thresher, comprising a rocking support and a weighted member secured thereto, said weighted member being adapted to move in vertical directions in relation to said thresher, and said support being hingedly related to the thresher.

24. In a combination harvester-thresher, the combination with a thresher, of a harvester, means for flexibly connecting the harvester and thresher, and rocking means mounted upon and alongside said thresher at the side of its connection with the harvester and embodying mechanism for counterbalancing the weight of a harvester.

25. In a machine of the class described, a thresher, a harvester, rockably and hingedly connected to the thresher and means on the thresher alongside the body thereof and connected to the harvester for counterbalancing the weight of the harvester.

26. In a machine of the class described, a harvester, a thresher having counterbalancing means supported alongside the body thereof, and detachable means connecting the thresher and harvester whereby when the latter is detached said counterbalancing means will be supported only by the thresher.

27. In a machine of the class described, a harvester having a support, means for connecting the thresher and the harvester support so that the latter may have rocking and hinged movement relative to the thresher, and counterbalancing mechanism on the thresher and adjustably secured to said support between the thresher and said connecting means.

28. In a machine of the class described, a thresher, a harvester having a support, means for rockably and hingedly connecting the harvester to the thresher, and mechanism connected to the thresher and positioned alongside the body thereof in substantially horizontal longitudinal relation thereto, and also connected to the harvester support, for counterbalancing the offset weight of the harvester.

29. In a machine of the class described, a thresher, a harvester having a support hingedly and rockably connected to the thresher, means connecting said harvester and support for torsionally moving the latter, said means permitting the hinging and rocking movements mentioned, and means supported alongside the thresher and connected to the harvester support for counterbalancing the offset weight of the harvester when the support therefor is torsionally moved.

30. In a machine of the class described, a thresher, a harvester having a support, means connecting said harvester and support for torsionally moving the latter, and weighted means supported on the thresher and connected to the harvester support for counterbalancing the offset weight of the harvester as the latter is being vertically moved.

EDWARD A. JOHNSTON.
CLEMMA R. RANEY.
ARNOLD E. W. JOHNSON.